United States Patent
Zhang

(10) Patent No.: US 10,609,653 B2
(45) Date of Patent: Mar. 31, 2020

(54) METHOD AND DEVICE FOR RELAY COMMUNICATION IN A USER EQUIPMENT OR A BASE STATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/167,539

(22) Filed: Oct. 23, 2018

(65) Prior Publication Data

US 2019/0059059 A1 Feb. 21, 2019

Related U.S. Application Data

(63) Continuation of application No. PCT/CN2017/078243, filed on Mar. 26, 2017.

(30) Foreign Application Priority Data

Apr. 23, 2016 (CN) .......................... 2016 1 0256582

(51) Int. Cl.
*H04W 52/46* (2009.01)
*H04W 52/24* (2009.01)
(Continued)

(52) U.S. Cl.
CPC ........ *H04W 52/243* (2013.01); *H04B 17/102* (2015.01); *H04B 17/336* (2015.01);
(Continued)

(58) Field of Classification Search
CPC ............ H04W 52/243; H04W 52/228; H04W 52/362; H04W 52/383; H04W 52/46;
(Continued)

(56) References Cited

U.S. PATENT DOCUMENTS 6,788,661 B1 * 9/2004 Ylitalo ................ H04B 7/0617
342/359
7,594,010 B2 * 9/2009 Dohler ................ H04B 7/2606
370/328
(Continued)

FOREIGN PATENT DOCUMENTS

CN 102546099 A 7/2012
CN 103166746 A 6/2013
(Continued)

*Primary Examiner* — Hai V Nguyen
(74) *Attorney, Agent, or Firm* — Maschoff Brennan

(57) ABSTRACT

The present disclosure discloses a method and device for narrowband mobile communication in wireless communication. The base station transmits first information, wherein the first information comprises a first power value and a first coefficient. The product of the first power value and the first coefficient is used to determine the transmission power of the first wireless signal. The transmitter of the first wireless signal is a first node. The present disclosure enables the transmitting UE to have a lower transmission power to ensure the receiving performance of the relay UE. In addition, the present disclosure can simultaneously reduce interference of data reception for the conventional UE on the base station side, thereby improving overall system performance.

14 Claims, 4 Drawing Sheets

(51) Int. Cl.
*H04W 72/04* (2009.01)
*H04W 52/36* (2009.01)
*H04B 17/10* (2015.01)
*H04B 17/336* (2015.01)
*H04W 52/38* (2009.01)
*H04W 52/22* (2009.01)

(52) U.S. Cl.
CPC ....... *H04W 52/228* (2013.01); *H04W 52/362* (2013.01); *H04W 52/383* (2013.01); *H04W 52/46* (2013.01); *H04W 72/0473* (2013.01)

(58) Field of Classification Search
CPC  H04W 72/0473; H04B 17/102; H04B 17/336
USPC .......................................................... 455/522
See application file for complete search history.

(56) References Cited

U.S. PATENT DOCUMENTS

| | | | | |
|---|---|---|---|---|
| 9,419,747 B2* | 8/2016 | Lim | ............ | H04L 1/0026 |
| 9,474,014 B2* | 10/2016 | Pu | ............ | H04W 48/16 |
| 9,565,641 B2* | 2/2017 | Ouchi | ............ | H04W 52/146 |
| 9,961,487 B1* | 5/2018 | Miao | ............ | H04W 4/023 |
| 10,034,322 B2* | 7/2018 | Ryu | ............ | H04W 52/383 |
| 10,206,200 B2* | 2/2019 | Kusashima | ............ | H04L 1/1854 |
| 10,243,775 B2* | 3/2019 | Zhang | ............ | H04L 27/34 |
| 10,306,502 B2* | 5/2019 | Thangarasa | ............ | H04W 76/11 |
| 10,313,839 B2* | 6/2019 | Hwang | ............ | H04W 4/027 |
| 10,321,363 B2* | 6/2019 | Bergstrom | ............ | H04B 7/0619 |
| 10,334,648 B2* | 6/2019 | Kim | ............ | H04L 5/0092 |
| 10,382,989 B2* | 8/2019 | Lee | ............ | H04W 76/14 |
| 10,383,035 B2* | 8/2019 | Sheng | ............ | H04W 48/12 |
| 10,383,147 B2* | 8/2019 | Rajagopal | ............ | H04W 74/0816 |
| 2006/0205356 A1* | 9/2006 | Laroia | ............ | H04B 7/0811 455/66.1 |
| 2007/0057718 A1* | 3/2007 | Coulson | ............ | H04B 1/76 327/551 |
| 2009/0252200 A1* | 10/2009 | Dohler | ............ | H04B 7/2606 375/141 |
| 2011/0019715 A1* | 1/2011 | Brisebois | ............ | H04B 7/0626 375/130 |
| 2011/0105135 A1* | 5/2011 | Krishnamurthy | ..... | H04W 16/10 455/450 |
| 2013/0078908 A1* | 3/2013 | Smith | ............ | H04B 7/155 455/11.1 |
| 2013/0082538 A1* | 4/2013 | Wambsganss | ............ | H01F 38/14 307/104 |
| 2013/0088088 A1* | 4/2013 | Wambsganss | ............ | H02J 5/005 307/104 |
| 2013/0147609 A1* | 6/2013 | Griffin | ............ | G06K 7/10158 340/10.5 |
| 2014/0269548 A1* | 9/2014 | Lim | ............ | H04L 1/0026 370/329 |
| 2014/0321416 A1* | 10/2014 | Pragada | ............ | H04W 88/04 370/329 |
| 2014/0329553 A1* | 11/2014 | Nakashima | ............ | H04W 52/365 455/522 |
| 2014/0335853 A1* | 11/2014 | Sartori | ............ | H04W 56/0015 455/426.1 |
| 2015/0049742 A1* | 2/2015 | Zhao | ............ | H04L 1/1812 370/336 |
| 2015/0085787 A1* | 3/2015 | Ouchi | ............ | H04L 5/0037 370/329 |
| 2015/0091706 A1* | 4/2015 | Chemishkian | ............ | H02J 50/40 340/10.34 |
| 2015/0229133 A1* | 8/2015 | Reynolds | ............ | H04W 52/281 307/24 |
| 2015/0358848 A1* | 12/2015 | Kim | ............ | H04W 24/10 370/252 |
| 2015/0382324 A1* | 12/2015 | Sheng | ............ | H04W 72/02 370/329 |
| 2016/0134438 A1* | 5/2016 | Marzetta | ............ | H04L 25/0228 370/315 |
| 2016/0150490 A1* | 5/2016 | Ouchi | ............ | H04W 72/12 455/522 |
| 2016/0165545 A1* | 6/2016 | Ouchi | ............ | H04W 52/146 455/522 |
| 2016/0165547 A1* | 6/2016 | Ouchi | ............ | H04W 52/146 455/522 |
| 2016/0183170 A1* | 6/2016 | Pu | ............ | H04W 48/16 455/434 |
| 2016/0212721 A1* | 7/2016 | Sheng | ............ | H04W 76/14 |
| 2016/0234873 A1* | 8/2016 | Ryu | ............ | H04W 76/14 |
| 2016/0255649 A1* | 9/2016 | Kusashima | ............ | H04W 28/06 370/280 |
| 2016/0261296 A1* | 9/2016 | Ouchi | ............ | H04W 72/12 |
| 2016/0270060 A1* | 9/2016 | Kusashima | ............ | H04L 1/1854 |
| 2016/0301515 A1* | 10/2016 | Ouchi | ............ | H04L 5/0057 |
| 2016/0353450 A1* | 12/2016 | Miao | ............ | H04W 76/14 |
| 2017/0086028 A1* | 3/2017 | Hwang | ............ | H04W 4/027 |
| 2017/0086114 A1* | 3/2017 | Jung | ............ | H04W 36/08 |
| 2017/0170931 A1* | 6/2017 | Kusashima | ............ | H04L 5/1469 |
| 2017/0188391 A1* | 6/2017 | Rajagopal | ............ | H04W 74/0816 |
| 2017/0215154 A1* | 7/2017 | Kim | ............ | H04W 52/24 |
| 2017/0238287 A1* | 8/2017 | Kusashima | ............ | H04W 28/04 370/280 |
| 2017/0245313 A1* | 8/2017 | Kim | ............ | H04L 5/0092 |
| 2017/0272299 A1* | 9/2017 | Chae | ............ | H04L 27/2662 |
| 2017/0280454 A1* | 9/2017 | Kusashima | ............ | H04W 28/04 |
| 2017/0295570 A1* | 10/2017 | Awad | ............ | H04W 72/0446 |
| 2017/0353819 A1* | 12/2017 | Yin | ............ | H04W 4/70 |
| 2017/0367014 A1* | 12/2017 | Bergstrom | ............ | H04B 7/0619 |
| 2017/0374539 A1* | 12/2017 | Chae | ............ | H04B 7/26 |
| 2018/0035354 A1* | 2/2018 | Martin | ............ | H04W 40/12 |
| 2018/0041857 A1* | 2/2018 | Ouchi | ............ | H04W 72/04 |
| 2018/0092027 A1* | 3/2018 | Sheng | ............ | H04W 40/22 |
| 2018/0123682 A1* | 5/2018 | Jung | ............ | H04W 40/12 |
| 2018/0124621 A1* | 5/2018 | Jung | ............ | H04W 76/14 |
| 2018/0152986 A1* | 5/2018 | Jung | ............ | H04W 48/20 |
| 2018/0176805 A1* | 6/2018 | Lee | ............ | H04W 24/08 |
| 2018/0176810 A1* | 6/2018 | Thangarasa | ............ | H04W 76/11 |
| 2018/0184301 A1* | 6/2018 | Mokrushin | ............ | H04W 16/02 |
| 2018/0219716 A1* | 8/2018 | Chae | ............ | H04L 27/2662 |
| 2018/0234163 A1* | 8/2018 | Yasukawa | ............ | H04W 16/26 |
| 2018/0242228 A1* | 8/2018 | Jung | ............ | H04W 24/10 |
| 2018/0249516 A1* | 8/2018 | Jung | ............ | H04W 76/11 |
| 2018/0263004 A1* | 9/2018 | Andersson | ............ | H04L 5/0007 |
| 2018/0332645 A1* | 11/2018 | Ryu | ............ | H04W 76/14 |
| 2018/0343081 A1* | 11/2018 | Lopez | ............ | H04L 1/00 |
| 2018/0343595 A1* | 11/2018 | da Silva | ............ | H04J 11/0073 |
| 2018/0343626 A1* | 11/2018 | Li | ............ | H04W 4/46 |
| 2018/0343699 A1* | 11/2018 | Sun | ............ | H04B 7/024 |
| 2018/0352453 A1* | 12/2018 | Gunnarsson | ............ | H04W 36/0083 |
| 2018/0368036 A1* | 12/2018 | Rune | ............ | H04W 36/00837 |
| 2019/0007175 A1* | 1/2019 | Kwak | ............ | H04L 5/00 |
| 2019/0028978 A1* | 1/2019 | Yasukawa | ............ | H04W 52/24 |
| 2019/0053249 A1* | 2/2019 | Zhang | ............ | H04W 72/085 |
| 2019/0059059 A1* | 2/2019 | Zhang | ............ | H04W 52/228 |
| 2019/0069277 A1* | 2/2019 | Awad | ............ | H04L 5/0053 |
| 2019/0075548 A1* | 3/2019 | Lee | ............ | H04W 72/02 |
| 2019/0089451 A1* | 3/2019 | Seo | ............ | H04W 88/04 |
| 2019/0090126 A1* | 3/2019 | Hayashi | ............ | H04W 72/0446 |
| 2019/0090250 A1* | 3/2019 | Lee | ............ | H04W 72/02 |
| 2019/0097751 A1* | 3/2019 | Li | ............ | H04L 5/0007 |
| 2019/0110177 A1* | 4/2019 | Lee | ............ | H04W 72/02 |
| 2019/0116475 A1* | 4/2019 | Lee | ............ | H04W 4/40 |
| 2019/0191461 A1* | 6/2019 | Lee | ............ | H04W 4/44 |
| 2019/0222980 A1* | 7/2019 | Lee | ............ | H04W 4/40 |
| 2019/0222981 A1* | 7/2019 | Lee | ............ | H04W 56/001 |
| 2019/0229960 A1* | 7/2019 | Lopez | ............ | H04B 1/0053 |
| 2019/0246249 A1* | 8/2019 | Lee | ............ | H04L 1/1614 |
| 2019/0289430 A1* | 9/2019 | Hwang | ............ | H04W 72/02 |
| 2019/0289554 A1* | 9/2019 | Li | ............ | H04L 5/0048 |
| 2019/0313374 A1* | 10/2019 | Lee | ............ | H04W 72/04 |

FOREIGN PATENT DOCUMENTS

| | | |
|---|---|---|
| CN | 103929393 A | 7/2014 |
| CN | 104363646 A | 2/2015 |
| JP | 5783936 B2 | 9/2015 |

(56) References Cited

FOREIGN PATENT DOCUMENTS

\* cited by examiner

METHOD AND DEVICE FOR RELAY COMMUNICATION IN A USER EQUIPMENT OR A BASE STATION

CROSS REFERENCE TO RELATED APPLICATION

This application is a continuation of International Application No. PCT/CN2017/078243, filed Mar. 26, 2017, claiming the priority benefit of Chinese Patent Application Serial Number 201610256582.9, filed on Apr. 23, 2016, the full disclosure of which is incorporated herein by reference.

BACKGROUND

Technical Field

The present disclosure relates to transmission schemes in wireless communication systems, and more particularly to a method and a device for supporting wireless relay transmission.

Related Art

A Layer-3 relay base station scheme is proposed in the R (Release) 9 of 3rd Generation Partner Project 3GPP. The relay base station has the function of a normal base station for a User Equipment (UE), and can independently schedule data and transmit a downlink HARQ-ACK (Hybrid Automatic Repeat reQuest).

In a conventional 3GPP system, data transmission occurs between a base station and a UE. In 3GPP R12, D2D (Device to Device) communication is proposed and discussed. The essential feature of D2D is to allow data transmission between UEs. In 3GPP R13, eD2D (Enhancements to LTE Device to Device) is proposed, and its main feature is to introduce the UE relay function. In eD2D, a relay user equipment (Relay UE) relays data exchange between a remote user equipment (Remote UE) and a base station.

In the 3GPP RAN (Radio Access Network) #69 plenary meeting, NB-IOT (NarrowBand Internet of Things) was proposed. Further, in the 3GPP RAN #71 plenary meeting (RP-160655), IoT (internet of thing) and FeD2D (Further Enhancements to LTE Device to Device) for wearable devices are proposed. In FeD2D, D2D communication may be implemented through an air interface similar to NB-IoT.

A typical application scenario of FeD2D is that there are multiple wearable devices around an intelligent terminal. The intelligent terminal relays data exchange between the wearable device and the base station, that is, the smart terminal and the wearable device are a Relay UE and a Remote UE, respectively.

SUMMARY

Release 12 D2D transmission is for the public safety scenario. Considering the reliability of the transmission and ensuring low interference to the base station side, the transmission power of the D2D transmission is related to the PL (Pathloss) between the base station and the D2D device. The PL between D2D devices is not considered. For FeD2D, considering the performance of the transmission and reducing the power consumption of the terminal device, how to determine the transmission power transmitted between the devices, especially the transmission power of the wearable device to the intelligent terminal relay, needs to be reconsidered.

An intuitive solution is to reuse the method of determining the transmission power in 3GPP R12, i.e., the terminal selects the smaller of the two given power values, in which the first power value is predefined, and the second power value is related to the PL between the base station and the D2D device. The larger the PL between the base station and the D2D device, the larger the second power value. However, the researchers found that in the application scenario corresponding to FeD2D, the PL of the wearable device to the base station is often much larger than the PL of the wearable device to the relay intelligent terminal. According to current understanding, it is an effective solution for reducing the power consumption of the wearable device, if the intelligent terminal can relay the data of the wearable device and transmit it to the base station. However, if using the R12 power control method here for wearable device, the unnecessary transmission power is increased, and the battery life is reduced.

The present disclosure provides a solution to the above problems. It should be noted that, in the case of no conflict, the features among the embodiments of the present disclosure may be combined with each other arbitrarily. For example, the embodiments in the UE and the features in the embodiments of the UE of the present disclosure may be applied to a base station, and vice versa. For another example, the embodiments of D2D transmitting UE (i.e., transmitting a wireless signal on a D2D link) and the features in the embodiments of the present disclosure may be applied to a D2D receiving UE (i.e., receiving the wireless signal on a D2D link) and vice versa. Further, although the original intention of the present disclosure is directed to FeD2D (i.e., D2D transmission is based on the narrowband), the solution of the present disclosure is also applicable to wideband D2D relay (i.e., D2D transmission is based on the broadband).

A method for a base station for relay communication is disclosed. The method comprises transmitting first information, the first information comprising a first power value and a first coefficient;

wherein the product of the first power value and the first coefficient is used to determine a transmission power of a first wireless signal; a transmitter of the first wireless signal is a first node.

In one embodiment, in D2D-based relay transmission, the smart terminal relay is the receiver of the transmission of the wearable device (the first node).

In one embodiment, in the conventional D2D and eD2D, the UE can directly obtain the PL between the base station and the UE to determine the transmission power. In FeD2D, the UE cannot obtain the PL of the sidelink, and thus the transmission power cannot be determined based on the PL of the sidelink. In the above method, the base station transmits the first power value and the first coefficient to the first node. The first node determines the transmission power of the first wireless signal according to the first power value and the first coefficient to better control the power consumption of the first node.

In one embodiment, the first information is high layer signaling.

In one sub-embodiment of the above embodiment, the first information is RRC (Radio Resource Control) dedicated information.

In one embodiment, the first wireless signal comprises one of control channel, data channel, broadcast channel, discovery channel, and synchronization signal.

In one sub-embodiment of the above embodiment, a physical layer channel including the first wireless signal is a PSCCH (Physical Sidelink Control Channel).

In one sub-embodiment of the above embodiment, a physical layer channel including the first wireless signal is a PSSCH (Physical Sidelink Shared Channel).

In one sub-embodiment of the above embodiment, a physical layer channel including the first wireless signal is a PSBCH (Physical Sidelink Broadcast Channel).

In one sub-embodiment of the above embodiment, a physical layer channel including the first wireless signal is transmitted on a PSDCH (Physical Sidelink Discovery Channel).

In one sub-embodiment of the above embodiment, a physical layer channel including the first wireless signal is transmitted on a PSSS (Primary Sidelink Synchronization Signal).

In one embodiment, the first wireless signal comprises a NB-PUSCH (Narrow Band-Physical Uplink Shared Channel).

In one embodiment, the first coefficient is a non-negative number that is not greater than one.

In one sub-embodiment of the above embodiment, the first coefficient is equal to (0.1*K) and K is a non-negative integer that is not greater than 10.

In one embodiment, the first node is a UE.

In one embodiment, the first node is a Remote UE (relayed UE).

In one embodiment, a receiver of the first wireless signal comprises a second node, the base station and the second node are non-co-located.

In one sub-embodiment, the second node is a UE.

In one sub-embodiment, the second node is a Relay UE.

In one sub-embodiment, that the base station and the second node are non-co-located means that the base station and the second node are two different communication devices.

In one sub-embodiment, that the base station and the second node are non-co-located means that no wired connection exists between the base station and the second node.

In one sub-embodiment, that the base station and the second node are non-co-located means that the base station and the second node are located at different locations.

In one embodiment, the receiver of the first wireless signal comprises the base station.

In one embodiment, the unit of the first power value is dBm (mili decibel).

In one embodiment, the unit of the first power value is mW (milliwatt).

In one embodiment, the transmission power of the first wireless signal is equal to the product of the first power value and the first coefficient.

In one sub-embodiment of the embodiment, the first power value is related to a channel type included in the first wireless signal, and the first coefficient is related to the channel type included in the first wireless signal.

In one sub-embodiment of the embodiment, the first power value is explicitly configured by the higher layer signaling.

In one sub-embodiment of the embodiment, the first coefficient is explicitly configured by the higher layer signaling.

In one sub-embodiment of the embodiment, the first power value is $P_i$, and the i is a positive integer not less than 1 and not greater than 6.

In which, $P_1, P_2, P_3, P_4, P_5, P_6$ is respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one sub-embodiment of the embodiment, the first coefficient is $\alpha_i$, and the i is a positive integer not less than 1 and not greater than 6.

In which, $\alpha_1, \alpha_2, \alpha_3, \alpha_4, \alpha_5$ and $\alpha_6$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one embodiment, the bandwidth occupied by the first wireless signal does not exceed 1080 kHz.

In one sub-embodiment of the embodiment, the bandwidth occupied by the first wireless signal is one of 3.75 KHz, 15 KHz, 45 KHz, 90 KHz, 180 KHz and 1080 KHz.

In one embodiment, the bandwidth occupied by the first wireless signal does not exceed 180 kHz.

In one sub-embodiment of the embodiment, the bandwidth occupied by the first wireless signal is one of 3.75 KHz, 15 KHz, 45 KHz, 90 KHz, and 180 KHz.

In one embodiment, the first node is a wearable device terminal.

Specifically, according to an aspect of the disclosure, the method further comprises receiving second information, the second information comprising a first channel quality;
wherein the first channel quality is used to determine the first power value, a transmitter of the second information is a second node, and a receiver of the first wireless signal comprises the second node; the first channel quality is for a channel from the first node to the second node.

In one embodiment, in the above aspect, the base station cannot directly obtain the channel quality of the wireless link of the first node and the second node. Transmission, by the second node, of the first channel quality obtained by the measurement to the base station ensures that the base station may determine the first power value according to the first channel quality, and transmit the first power value to the first node to control the transmission function and adjust power of the first node.

In one embodiment, the first channel quality comprises an RSRP (Reference Signal Received Power).

In one sub-embodiment of the embodiment, the determination of the first power value by the first channel quality means that the first power value is equal to the RSRP.

In one sub-embodiment of the embodiment, the determination of the first power value by the first channel quality means that the first power value is linear with the RSRP.

In one embodiment, the first channel quality comprises RSRQ (Reference Signal received quality).

In one sub-embodiment of the embodiment, the determination of the first power value by the first channel quality means that the first power value increases as the RSRQ increases, and the first power value decreases as the RSRQ decreases.

In one embodiment, the first channel quality comprises a CQI Channel Quality Indicator.

In one sub-embodiment of the embodiment, the determination of the first power value by the first channel quality means that the first power value increases as the index corresponding to the CQI increases, and the first power value decreases as the index corresponding to the CQI decreases.

In one embodiment, the unit of the first channel quality is dBm.

In one embodiment, the unit of the first channel quality is mW.

Specifically, according to an aspect of the disclosure, the method further comprises transmitting a second wireless signal;
wherein the second wireless signal is used to determine a second channel quality, the first information further comprises a second coefficient, and a product of the second channel quality and the second coefficient is used to determine the transmission power of the first wireless signal; the second channel quality is for a channel from a cell maintained by the base station to the first node.

In one embodiment, the method is characterized in that, when the first node sends a signal to the second node, the first node selects the transmission power not only referring the signal quality of the link of the first node to the second node (the first channel quality), but also referring the channel quality from a cell maintained by the base station to the first node (the second channel quality) to ensure the second node to correctly receive the signal from the first node and also ensures not to interfere with the data reception of the cell maintained by the base station.

In one embodiment, the second wireless signal comprises an RS (Reference Signal).

In one embodiment, the second wireless signal comprises at least one of CRS (Common Reference Signal), CSI-RS (Channel State Information Reference Signal), and NB-IoT-RS (Narrow Band Internet of Things Reference Signal).

In one sub-embodiment of the embodiment, the NB-IoT-RS is a reference signal for narrowband communication between the base station and the first node.

In one sub-embodiment of the embodiment, the NB-IoT-RS is an NB-RS (Narrow Band Reference Signal).

In one sub-embodiment of the embodiment, the NB-IoT-RS is at least used for demodulation of a NB-PBCH (Narrow Band Physical Broadcast Channel).

In one embodiment, the unit of the second channel quality is dB.

In one sub-embodiment of the embodiment, the second channel quality is a PL of a wireless link of a serving cell of the base station to the first node.

Specifically, according to an aspect of the disclosure, the above method is characterized in that the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

In one embodiment, the unit of the third power value is one of dBm and mW.

In one embodiment, the third power value is fixed and the third power value is equal to $P_{CMAX}$.

In one embodiment, the third power value is explicitly configured (i.e., directly indicated by the higher layer signaling), and the third power value is related to a channel type included in the first wireless signal.

In one embodiment, the third power value is explicitly configured, and is explicitly configured by RRC signaling.

In one sub-embodiment of the embodiment, the third power value is $P_{CMAX,i}$, and the i is a positive integer not less than 1 and not greater than 6;
wherein $P_{CMAX,1}$, $P_{CMAX,2}$, $P_{CMAX,3}$, $P_{CMAX,4}$, $P_{CMAX,5}$, and $P_{CMAX,6}$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one embodiment, the first coefficient is explicitly configured, and the first coefficient is related to a channel type included in the first wireless signal.

In one sub-embodiment of the embodiment, the first coefficient is $\alpha_i$, and the i is a positive integer not less than 1 and not greater than 6;
wherein, $\alpha_1$, $\alpha_2$, $\alpha_3$, $\alpha_4$, $\alpha_5$ and $\alpha_6$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one embodiment, the first coefficient is a non-negative real number not greater than 1.

In one embodiment, the first coefficient is equal to (0.1*M) and M is a non-negative integer not greater than 10.

In one embodiment, the second coefficient is explicitly configured, and the second coefficient is related to a channel type included in the first wireless signal.

In one sub-embodiment of the embodiment, the first coefficient is $\beta_i$, and the i is a positive integer not less than 1 and not greater than 6;
wherein, $\beta_1$, $\beta_2$, $\beta_3$, $\beta_4$, $\beta_5$ and $\beta_6$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one embodiment, the second coefficient is a non-negative real number not greater than 1.

In one embodiment, the second coefficient is equal to (0.1*M) and M is a non-negative integer not greater than 10.

In one embodiment, the unit of the fourth power value is one of dBm and mW.

In one embodiment, the fourth power value is equal to a product of the first power value and the first coefficient.

In one sub-embodiment of the embodiment, the first power value is $P_i$, and the i is a positive integer not less than 1 and not greater than 6.

In which, $P_1$, $P_2$, $P_3$, $P_4$, $P_5$ and $P_6$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one embodiment, the fourth power value is linearly related to the first product and the second product respectively, wherein the first product is equal to a product of the first power value and the first coefficient, and the second product is equal to a product of the second signal quality and the second coefficient.

In one sub-embodiment of the embodiment, the fourth power value is equal to the sum of the first product plus the second product.

In one sub-embodiment of the embodiment, the first power value is $P_i$, and the i is a positive integer not less than 1 and not greater than 6.

In which, $P_1$, $P_2$, $P_3$, $P_4$, $P_5$ and $P_6$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

Specifically, according to an aspect of the disclosure, the above method is characterized in that the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient. The first path loss decreases linearly as the first power value increases.

In one embodiment, the unit of the third power value is one of dBm and mW.

In one embodiment, the third power value is fixed and the third power value is equal to $P_{CMAX}$.

In one embodiment, the third power value is explicitly configured, and the third power value is related to a channel type included in the first wireless signal.

In one embodiment, the third power value is explicitly configured, and is explicitly configured by RRC signaling.

In one sub-embodiment of the embodiment, the third power value is $P_{CMAX,i}$, and the i is a positive integer not less than 1 and not greater than 6;
wherein $P_{CMAX,1}$, $P_{CMAX,2}$, $P_{CMAX,3}$, $P_{CMAX,4}$, $P_{CMAX,5}$ and $P_{CMAX,6}$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one embodiment, the first coefficient is explicitly configured, and the first coefficient is related to a channel type included in the first wireless signal.

In one sub-embodiment of the embodiment, the first coefficient is $\alpha_i$, and the i is a positive integer not less than 1 and not greater than 6;
wherein, $\alpha_1$, $\alpha_2$, $\alpha_3$, $\alpha_4$, $\alpha_5$ and $\alpha_6$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one embodiment, the first coefficient is a non-negative real number not greater than 1.

In one embodiment, the first coefficient is equal to (0.1*M) and M is a non-negative integer not greater than 10.

In one embodiment, the second coefficient is explicitly configured, and the second coefficient is related to a channel type included in the first wireless signal.

In one sub-embodiment of the embodiment, the first coefficient is $\beta_i$, and the i is a positive integer not less than 1 and not greater than 6;
wherein, $\beta_1$, $\beta_2$, $\beta_3$, $\beta_4$, $\beta_5$ and $\beta_6$ are respectively for:
the physical channel of the first wireless signal comprising a PSCCH;
the physical channel of the first wireless signal comprising a PSSCH;
the physical channel of the first wireless signal comprising a PSDCH;
the physical channel of the first wireless signal comprising a PSBCH;
the physical channel of the first wireless signal comprising a PSSS.

In one embodiment, the second coefficient is a non-negative real number not greater than 1.

In one embodiment, the second coefficient is equal to (0.1*M) and M is a non-negative integer not greater than 10.

In one embodiment, the first power value is RSRP.

In one embodiment, the first path loss is a path loss of a wireless link of the first node to the second node.

In one embodiment, the coefficient of the linear reduction is 1.

In one embodiment, the first power value is used to determine the first path loss.

In one sub-embodiment of the embodiment, the determination of the first path loss by the first power loss means that the first path loss is obtained by reducing the first power value from the transmission power of the third wireless signal by the first node. Obtaining the first power value, and the third wireless signal is transmitted by the first node.

In one embodiment, the unit of the fifth power value is one of dBm and mW.

In one embodiment, the fifth power value is equal to $P_{FeD2D,i}$ the unit of the fifth power value is dBm, and the $P_{FeD2D,i}$ is equal to $10 \cdot \log_{10}(W_i) + P_{O\_FeD2D,i} + \min\{\alpha_i \cdot PL_1, \beta_i \cdot PL_2\}$, wherein i is a positive integer not less than 1 and not greater than 6, and min {X, Y} represents a smaller value of X and Y.

In one sub-embodiment of the embodiment, $W_i$ is related to the physical channel included in the first wireless signal, and $W_i$ is the number of RB corresponding to the bandwidth occupied by the physical channel.

As an example of this sub-embodiment, $W_1$, $W_2$, $W_3$, $W_4$, $W_5$ and $W_6$ are respectively for PSCCH, PSSCH, PSDCH, PSBCH and PSSS.

In one sub-embodiment of the embodiment, $P_{O\_FeD2D,i}$ is not less than −126 dBm and is not greater than 31 dBm.

In one sub-embodiment of the embodiment, $P_{O\_FeD2D,i}$ is related to the physical channel included in the first wireless signal, and $P_{O\_FeD2D,1}$, $P_{O\_FeD2D,2}$, $P_{O\_FeD2D,3}$, $P_{O\_FeD2D,4}$, $P_{O\_FeD2D,5}$ and $P_{O\_FeD2D,6}$ are respectively for PSCCH, PSSCH, PSDCH, PSBCH and PSSS.

In one sub-embodiment of the embodiment, $PL_1$ is first path loss.

In one sub-embodiment of the embodiment, $PL_2$ is the second channel quality.

The disclosure discloses a method for use in a UE for relay communication. The method comprises:
  receiving first information, the first information comprising a first power value and a first coefficient; and
  transmitting a first wireless signal;
  wherein the product of the first power value and the first coefficient is used to determine a transmission power of the first wireless signal.

Specifically, according to an aspect of the disclosure, the method further comprises transmitting a third wireless signal;
  wherein the third wireless signal is used to determine a first channel quality, the first channel quality being used to determine the first power value. A receiver of the third wireless signal comprises a second node, the second node and a transmitter of the first information being non-co-located.

In one embodiment, the above method is characterized in that the first node transmits the third wireless signal to help the second node to obtain the channel quality of the wireless link between the first node and the second node.

In one embodiment, the bandwidth occupied by the third wireless signal does not exceed 1080 kHz.

In one sub-embodiment of the embodiment, the bandwidth occupied by the third wireless signal is one of 3.75 KHz, 15 KHz, 45 KHz, 90 KHz, 180 KHz and 1080 KHz.

In one embodiment, the third wireless signal comprises a demodulation reference signal.

In one embodiment, that the second node and the transmitter of the first information are non-co-located means that the second node and the transmitter of the first information are two different communication devices.

In one embodiment, that the second node and the transmitter of the first information are non-co-located means that no wired connection exists between the second node and the transmitter of the first information.

In one embodiment, that the second node and the transmitter of the first information are non-co-located means that the second node and the transmitter of the first information are located at different locations.

Specifically, according to an aspect of the disclosure, the method further comprises receiving second information;
  wherein the second wireless signal is used to determine a second channel quality, and the second channel quality is for a channel of a transmitter of the second wireless signal to the UE. The first information further comprises a second coefficient, a product of the second channel quality and the second coefficient being used to determine a transmission power of the first wireless signal.

In one embodiment, the method further comprises determining the second channel quality according to the second wireless signal.

In one embodiment, the second wireless signal comprises RS.

In one sub-embodiment of the embodiment, the determination of the second channel quality by the second wireless signal means that the transmission power of the second wireless signal is fixed or explicitly configured, and the transmission power is obtained in advance by the UE. The UE obtains the second channel quality by subtracting the RSRP of the second wireless signal from the transmission power.

In one embodiment, the unit of the second channel quality is dB.

Specifically, according to an aspect of the disclosure, the above method is characterized in that the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

Specifically, according to an aspect of the disclosure, the above method is characterized in that the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient. The first path loss decreases linearly as the first power value increases.

The disclosure discloses a method for use in a UE for relay communication. The method comprises:
  transmitting second information, the second information comprising a first channel quality; and
  receiving a first wireless signal;
  wherein the transmitter of the first wireless signal is a first node; the first channel quality is for a channel from the first node to the UE; a receiver of the second information comprises a first cell, and the maintenance base station of the first cell and the first node are non-co-located; the first channel quality is used to determine a transmission power of the first wireless signal.

In one embodiment, the first cell is a serving cell of the UE.

In one embodiment, the first channel quality is used by the first cell to determine a first power value, and a product of the first power value and the first coefficient is used to determine a transmission power of the first wireless signal, wherein the first power value and the first coefficient are configured by the first cell.

Specifically, according to an aspect of the disclosure, the method further comprises receiving a third wireless signal;
wherein the third wireless signal is used to determine the first channel quality, In one embodiment, the above method is characteristic in that the UE obtains the first channel quality by receiving or measuring the third wireless signal, and transmits the first channel quality to the base station by using the second information. Based on this, the base station can obtain the channel quality of the first node to the UE, that is, the channel quality on the sidelink. The base station determines the first power value according to the first channel quality, and transmits the first power value to the first node to guide the first node to perform control and adjustment of the transmission power. The method has the advantages that the first node is prevented from directly detecting the transmission signal of the UE to obtain the first channel quality. The receiving complexity of the first node is reduced, and the power consumption of the UE due to the transmission of signals is also reduced.

In one embodiment, the method further comprises: determining the first channel quality according to the third wireless signal.

In one embodiment, the third wireless signal comprises RS.

In one sub-embodiment of the embodiment, the determination of the first channel quality by the third wireless signal means that the first channel quality comprises a first RSRP, and the first RSRP is for the RS included in the third wireless signal.

In one additional embodiment of this sub-embodiment, the unit of the first RSRP is dBm.

In one additional embodiment of this sub-embodiment, the unit of the first RSRP is mW.

The present disclosure discloses a base station used for relay communication, comprising:
a first processing module transmitting first information, the first information comprising a first power value and a first coefficient, receiving second information, the second information comprising a first channel quality, and transmitting a second wireless signal;
wherein the product of the first power value and the first coefficient is used to determine the transmission power of a first wireless signal; a transmitter of the first wireless signal is a first node; the first channel quality is used to determine the first power value, a transmitter of the second information is a second node, and the receiver of the first wireless signal comprises the second node; the first channel quality is for a channel from the first node to the second node; the second wireless signal is used to determine a second channel quality, the first information further comprises a second coefficient, and a product of the second channel quality and the second coefficient is used to determine the transmission power of the first wireless signal; the second channel quality is for a channel from a cell maintained by the base station to the first node.

In one embodiment, the above base station device is characterized in that the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

In one embodiment, the above base station device is characterized in that the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient; the first path loss decreases linearly as the first power value increases.

The present disclosure discloses a user equipment used for relay communication, comprising:
a second processing module receiving first information, the first information comprising a first power value and a first coefficient, transmitting a third wireless signal, and receiving a second wireless signal; and
a first transmitting module transmitting a first wireless signal;
wherein the product of the first power value and the first coefficient is used to determine a transmission power of the first wireless signal; the third wireless signal is used to determine a first channel quality, and the first channel quality is used to determine the first power value. A receiver of the third wireless signal comprises a second node; the second node and a transmitter of the first information are non-co-located; the second wireless signal is used to determine a second channel quality, the first information further comprises a second coefficient, and a product of the second channel quality and the second coefficient is used to determine the transmission power of the first wireless signal; the second channel quality is for a channel of a transmitter of the second wireless signal to the first node.

In one embodiment, the above user equipment is characterized in that the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

In one embodiment, the above user equipment is characterized in that the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient; the first path loss decreases linearly as the first power value increases.

The present disclosure discloses a user equipment used for relay communication, comprising:
a third processing module transmitting second information, the second information comprising a first channel quality, and receiving a third wireless signal; and
a first receiving module receiving a first wireless signal;

wherein a transmitter of the first wireless signal is a first node; the first channel quality is for a channel of the first node to the user equipment; a receiver of the second information comprises a first cell, and the base station maintained by the first cell and the first node are non-co-located. The first channel quality is used to determine the transmission power of the first wireless signal. The third wireless signal is used to determine the first channel quality.

In one embodiment, the above user equipment is characterized in that the third processing module further receives a third wireless signal, wherein the third wireless signal is used to determine the first channel quality.

In one embodiment, compared with the prior art, the present disclosure has the following technical advantages.

Through the first information, the base station transmits the related information of the channel quality of the sidelink to the Remote UE to help the Remote UE to adjust the transmission power based on the channel quality of the sidelink, or directly adjust the transmission power of the sidelink according to channel quality of the sidelink. While ensuring that the Relay UE can correctly receive the signal transmitted by the Remote UE, the transmission power of the Remote UE is lowered, and the battery life is improved.

Through the second coefficient and the second wireless signal, the Remote UE can obtain the channel quality directly from the base station to the Remote UE, and the channel quality is also considered in the transmission power of the Remote UE. On the premise of ensuring the first point, it also ensures that the transmission of the Remote UE does not interfere with the uplink reception of the conventional UE by the base station.

Through the third wireless signal, the Relay UE measures and obtains the channel quality of the sidelink, and transmits the channel quality of the sidelink to the base station by using the second information, thereby avoiding transmitting the reference signal of the sidelink by the Remote UE.

The method of measuring the reference signal by the Remote UE reduces the complexity of the Remote UE and the transmission power consumption of the Relay UE.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further detail in conjunction with the drawings. It should be noted that the embodiments in the application and the characteristics of the embodiments may be arbitrarily combined if there is no conflict.

Embodiment I

Figure 1:
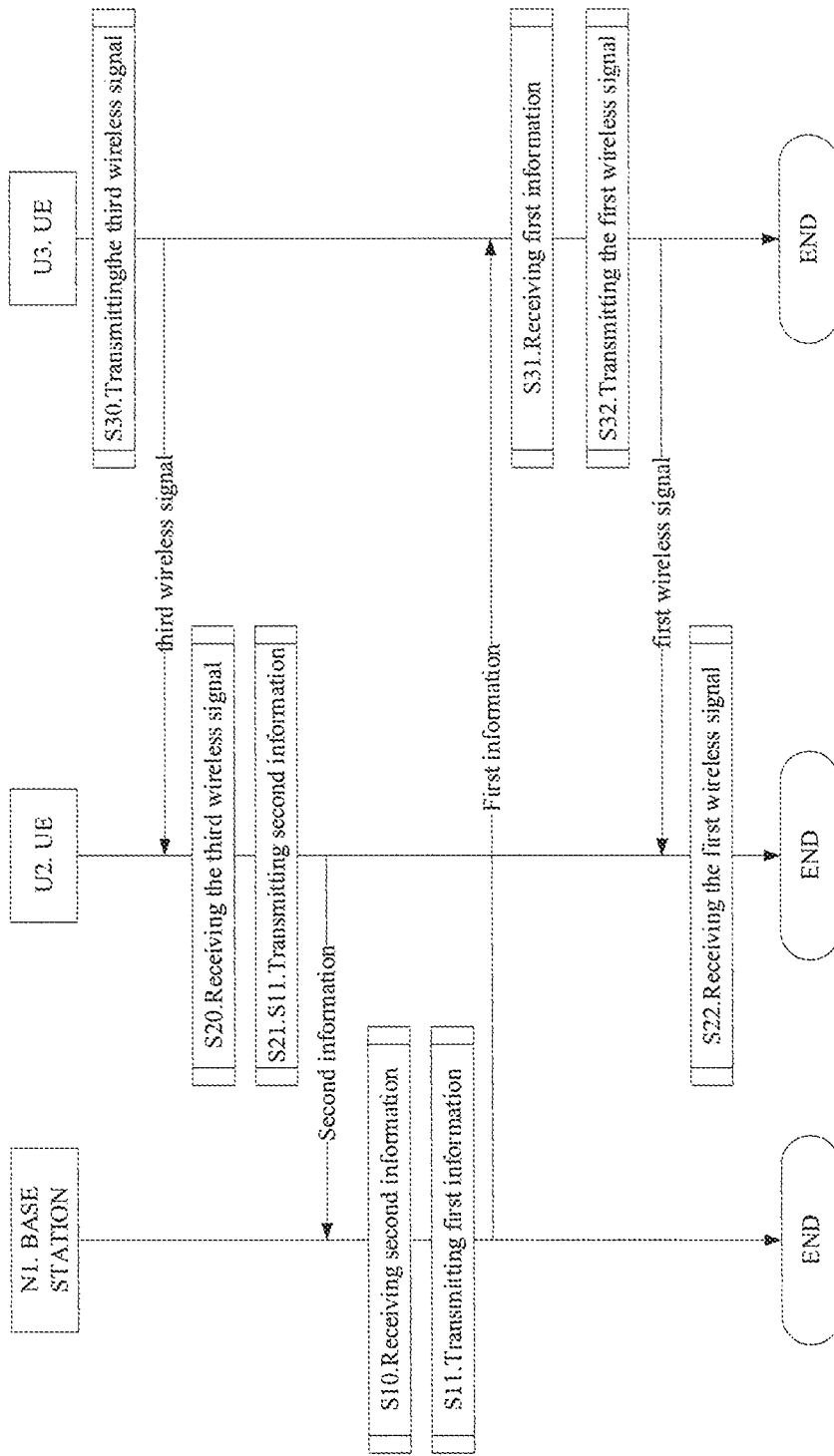
FIG. 1 is a flow chart illustrating the relay transmission according to an embodiment of the present disclosure.

Embodiment I illustrates the flow chart for the relay transmission, as shown in FIG. 1. In FIG. 1, the base station N1 is the maintenance base station of the serving cell of the UE U2, and the base station N1 is also the maintenance base station of the serving cell of the UE U3.

For the base station N1, second information is received in step S10, and first information is transmitted in step S11.

For UE U2, a third wireless signal is received in step S20, second information is transmitted in step S21, and a first wireless signal is received in step S22.

For UE U3, a third wireless signal is transmitted in step S30, first information is received in step S31, and a first wireless signal is transmitted in S32.

In Embodiment I, the first information comprising a first power value and a first coefficient; the product of the first power value and the first coefficient is used to determine a transmission power of a first wireless signal; a transmitter of the first wireless signal is a first node; the second information comprising a first channel quality; the first channel quality is used to determine the first power value; the first channel quality is for a channel from the UE U3 to the UE U2; the second wireless signal is used to determine a second channel quality, the first information further comprises a second coefficient, and a product of the second channel quality and the second coefficient is used to determine the transmission power of the first wireless signal; the second channel quality is for the base station N1 to the UE U3.

In one sub-embodiment, the first information comprises first power value, first coefficient, and second coefficient. The first power value, the first coefficient, and the second coefficient are used to determine a transmission power of the first wireless signal.

In one sub-embodiment, the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

In one sub-embodiment, the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient; the first path loss decreases linearly as the first power value increases.

Embodiment II

Embodiment II illustrates a flow chart illustrating the transmission of the second wireless signal, as shown in FIG.

Figure 2:
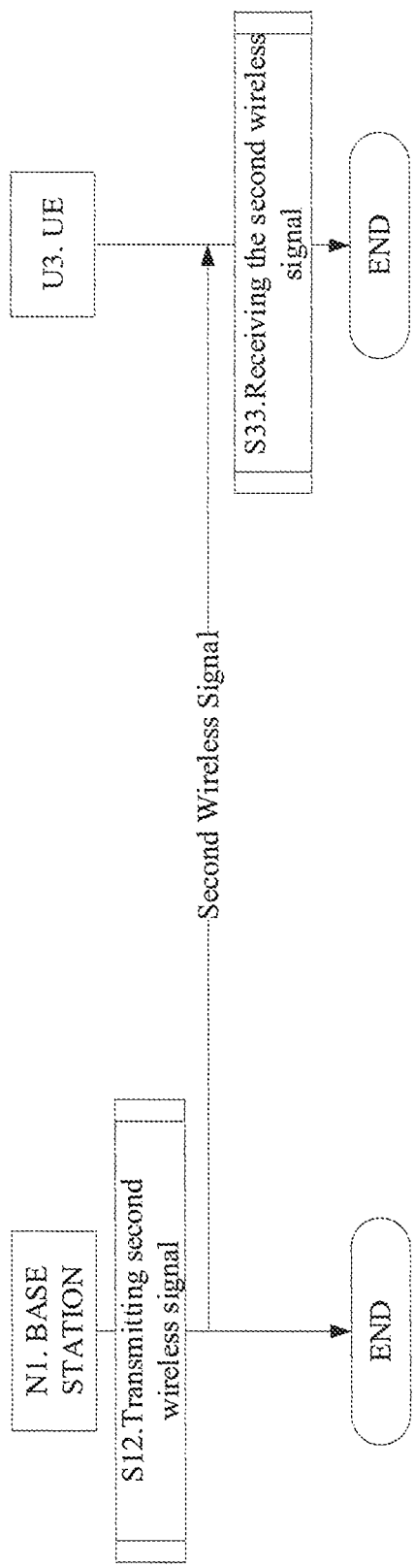
FIG. 2 is a flow chart illustrating the transmission of the second wireless signal according to an embodiment of the present disclosure.

2. In FIG. 2, the base station N1 is the maintenance base station of the serving cell of the UE U3.

For the base station N1, the second wireless signal is transmitted in step S12.

For UE U3, the second wireless signal is received in step S33.

In one sub-embodiment, the second wireless signal comprises at least one of CRS and NB-RS.

Embodiment III

Figure 3:
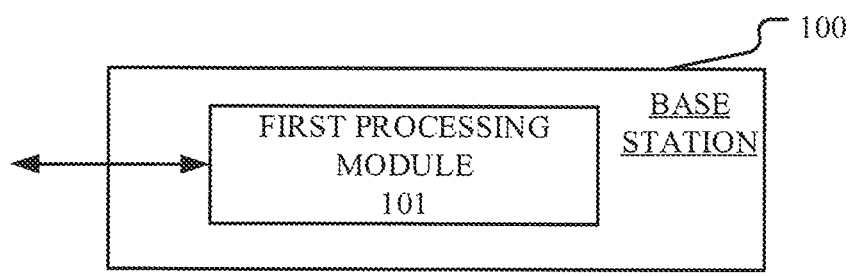
FIG. 3 is a block diagram showing the possessing device of the base station according to an embodiment of the present disclosure.

Embodiment III illustrates a block diagram showing the possessing device of the base station, as shown in FIG. 3. In FIG. 3, the base station processing device 100 comprises a first processing module 101.

The first processing module 101 transmits first information, receives second information, and transmits a second wireless signal, wherein the first information comprises a first power value and a first coefficient; the second information comprises a first channel quality.

wherein the product of the first power value and the first coefficient is used to determine the transmission power of a first wireless signal; a transmitter of the first wireless signal is a first node; the first channel quality is used to determine the first power value, a transmitter of the second information is a second node, and the receiver of the first wireless signal comprises the second node; the first channel quality is for a channel from the first node to the second node; the second wireless signal is used to determine a second channel quality, the first information further comprises a second coefficient, and a product of the second channel quality and the second coefficient is used to determine the transmission power of the first wireless signal; the second channel quality is for a channel from a cell maintained by the base station to the first node.

In one embodiment, the second information further comprises HARQ-ACK (Hybrid Automatic Repeat ReQuest) information for data transmission on the link between the first node and the second node.

Embodiment IV

Figure 4:
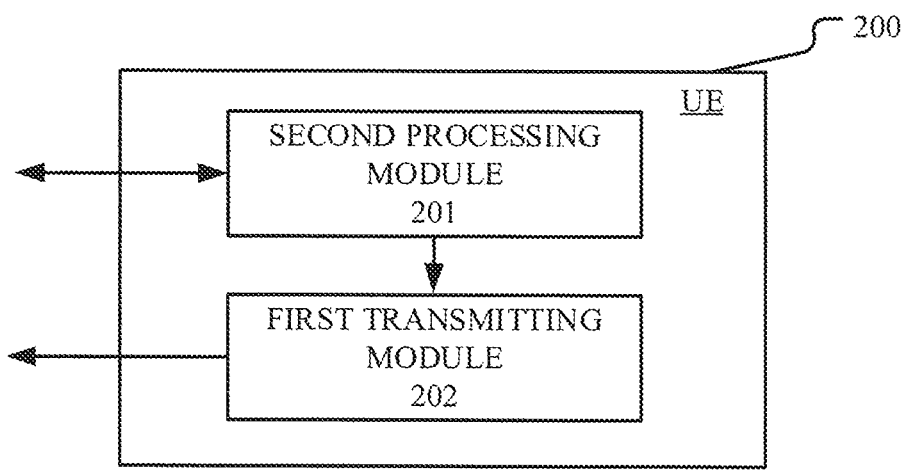
FIG. 4 is a block diagram showing the possessing device of the user equipment according to an embodiment of the present disclosure.

Embodiment IV illustrates a block diagram showing the possessing device of the user equipment, as shown in FIG. 4. In FIG. 4, the UE processing device 200 comprises a second processing module 201 and a first transmitting module 202.

The second processing module 201 receives first information, transmits a third wireless signal, and receives a second wireless signal, the first information comprising a first power value and a first coefficient.

The first transmitting module 202 transmits a first wireless signal.

The product of the first power value and the first coefficient is used to determine a transmission power of the first wireless signal; the third wireless signal is used to determine a first channel quality; the first channel quality is used to determine the first power value. A receiver of the third wireless signal comprises a second node; the second node and a transmitter of the first information are non-co-located; the second wireless signal is used to determine a second channel quality, the first information further comprises a second coefficient, and a product of the second channel quality and the second coefficient is used to determine the transmission power of the first wireless signal; the second channel quality is for a channel of the transmitter of the second wireless signal to the first node.

In one sub-embodiment, the second processing module 201 further determines the second channel quality according to the second wireless signal.

In one sub-embodiment, the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

In one sub-embodiment, the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient; the first path loss decreases linearly as the first power value increases.

Embodiment V

Figure 5:
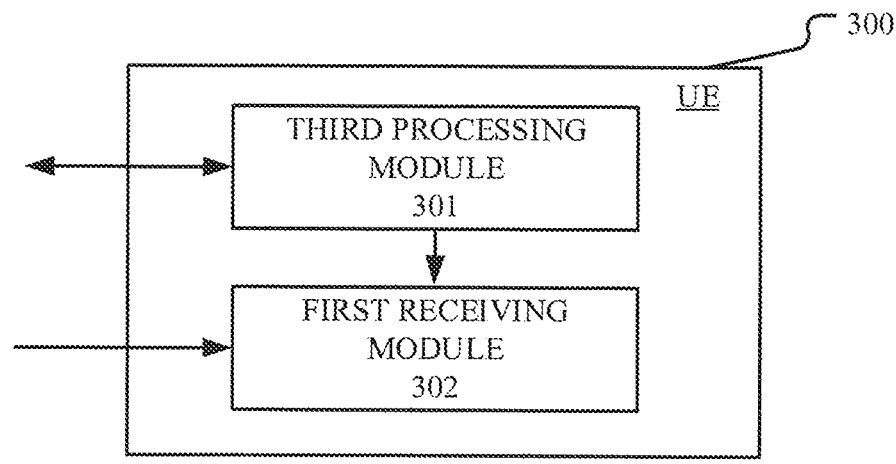
FIG. 5 is a block diagram showing the possessing device of the user equipment according to another embodiment of the present disclosure.

Embodiment V illustrates a block diagram showing the possessing device of the user equipment, as shown in FIG. 5. In FIG. 5, the UE processing device 300 comprises a third processing module 301 and a first receiving module 302.

The third processing module 301 transmits second information and receives a third wireless signal, the second information comprising a first channel quality.

The first receiving module 302 receives the first wireless signal.

A transmitter of the first wireless signal is a first node; the first channel quality is for a channel of the first node to the user equipment; a receiver of the second information comprises a first cell, and the base station maintained by the first cell and the first node are non-co-located. The first channel quality is used to determine the transmission power of the first wireless signal. The third wireless signal is used to determine the first channel quality.

In one embodiment, the second processing module 301 further transmits the second information. The second information is used to determine the first time-frequency resource. The second wireless signal is transmitted in the first time-frequency resource.

In one sub-embodiment, the third processing module 301 further determines the first channel quality according to the third wireless signal.

Embodiment VI

Embodiment VI Illustrates

Figure 6:
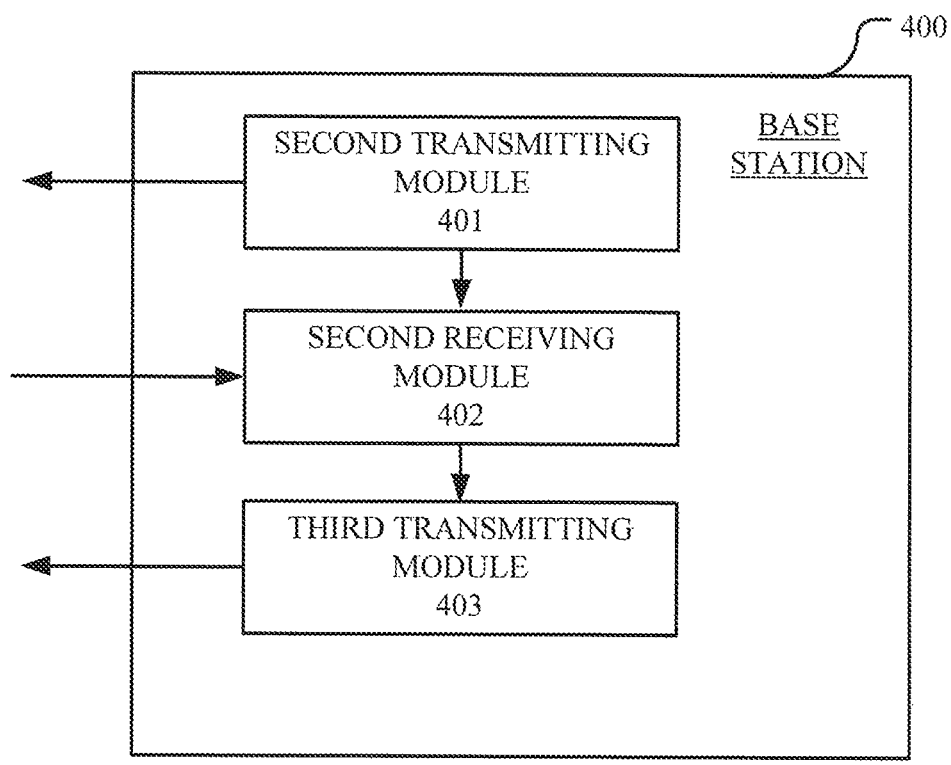
FIG. 6 is a block diagram showing the possessing device of the base station according to another embodiment of the present disclosure.

FIG. 6 is a block diagram showing the possessing device of another base station, as shown in FIG. 6. In FIG. 6, the base station processing device 400 comprises a second transmitting module 401, a second receiving module 402, and a third transmitting module 403.

The second transmitting module 401 transmits a second wireless signal.

The second receiving module 402 receives second information, the second information comprising a first channel quality.

The third transmitting module 403 transmits first information, the first information comprising a first power value and a first coefficient.

A product of the first power value and the first coefficient is used to determine the transmission power of the first wireless signal. A transmitter of the first wireless signal is a first node. The first channel quality is used to determine the first power value. A transmitter of the second information is a second node, and the receiver of the first wireless signal comprises the second node. The first channel quality is for a channel of the first node to the second node. The second wireless signal is used to determine a second channel quality, the first information further comprises a second coefficient, and a product of the second channel quality and the second coefficient is also used to determine the transmission power of the first wireless signal. The second channel quality is for a channel from a cell maintained by the base station to the first node.

In one sub-embodiment, the second information further comprises an identifier of the first node.

As an embodiment of the sub-instance, the identifier of the first node is an RNTI (RNTI Radio Network Tempory Identity) of the first node.

As an embodiment of the sub-embodiment, the identifier of the first node is a PLMN-ID (Public Land Mobile Network-Identifier) of the first node.

As an embodiment of the sub-embodiment, the identifier of the first node is a Layer-2 ID (Identifier) of the first node.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure include but not limited to mobile phones, tablet computers, notebooks, vehicle-mounted communication equipment's, wireless sensors, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station in the present application comprises but not limited to radio communication equipment s such as macro-cellular base stations, micro-cellular base stations, home base stations, and relay base station.

The above are merely the embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for a base station for relay communication, comprising:
    transmitting first information, the first information comprising a first power value and a first coefficient;
    wherein the product of the first power value and the first coefficient is used to determine a transmission power of a first wireless signal; a transmitter of the first wireless signal is a first node.

2. The method according to claim 1, wherein the method further comprises:
    receiving second information, the second information comprising a first channel quality; or
    transmitting a second wireless signal;
        wherein the first channel quality is used to determine the first power value, a transmitter of the second information is a second node, and a receiver of the first wireless signal comprises the second node; the first channel quality is for a channel from the first node to the second node; the second wireless signal is used to determine a second channel quality, the first information further comprises a second coefficient, and a product of the second channel quality and the second coefficient is used to determine the transmission power of the first wireless signal; the second channel quality is for a cell maintained by the base station to the first node.

3. The method according to claim 2, wherein the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

4. The method according to claim 2, wherein the transmission power of the first
    wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient; the first path loss decreases linearly as the first power value increases.

5. A method for a user equipment for relay communication, comprising:
    receiving first information, the first information comprising a first power value and a first coefficient; and
    transmitting a first wireless signal;
    wherein the product of the first power value and the first coefficient is used to determine a transmission power of the first wireless signal.

6. The method according to claim 5, wherein
    transmitting a third wireless signal; or receiving a second wireless signal;
    wherein the third wireless signal is used to determine a first channel quality; the first channel quality is used to determine the first power value; a receiver of the third wireless signal comprises a second node; the second node and a transmitter of the first information are non-co-located; the second wireless signal is used to determine a second channel quality; the second channel quality is for a channel of a transmitter of the second wireless signal to the UE; the first information further comprises a second coefficient; a product of the second channel quality and the second coefficient is used to determine a transmission power of the first wireless signal.

7. The method according to claim 6, wherein the transmission power of the first wireless signal is a smaller value of third power value and fifth power value, wherein the third power value is fixed, or the third power value is explicitly configured, the fifth power value is associated with the product of the first power value and the first coefficient, or the product of the second channel quality and the second coefficient, or both the product of the first power value and the first coefficient and the product of the second channel quality and the second coefficient.

8. The method according to claim 6, wherein the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient; the first path loss decreases linearly as the first power value increases.

9. A base station for relay communication, comprising:
a first processing module transmits first information, receiving second information and transmitting a second wireless signal, wherein the first information comprises a first power value and a first coefficient, and the second information comprises a first channel quality;
wherein the product of the first power value and the first coefficient is used to determine a transmission power of a first wireless signal; a transmitter of the first wireless signal is a first node; the first channel quality is used to determine the first power value; a transmitter of the second information is a second node, the receiver of the first wireless signal comprises the second node; the first channel quality is for a channel from the first node to the second node; the second wireless signal is used to determine a second channel quality, the first information further comprises a second coefficient; a product of the second channel quality and the second coefficient is used to determine a transmission power of the first wireless signal; the second channel quality is for a channel from a cell maintained by the base station device to the first node.

10. The base station according to claim 9, wherein the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

11. The base station according to claim 9, wherein the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient;
the first path loss decreases linearly as the first power value increases.

12. A user equipment for relay communication, comprising:
a second processing module receiving first information, the first information comprising a first power value and a first coefficient, transmitting a third wireless signal, and receiving a second wireless signal; and
a first transmitting module transmitting a first wireless signal;
wherein the product of the first power value and the first coefficient is used to determine a transmission power of the first wireless signal; the third wireless signal is used to determine a first channel quality; the first channel quality is used to determine the first power value; a receiver of the third wireless signal comprises a second node; the second node and a transmitter of the first information are non-co-located; the second wireless signal is used to determine a second channel quality, the first information further comprises a second coefficient, and a product of the second channel quality and the second coefficient is used to determine the transmission power of the first wireless signal; the second channel quality is for a channel of a transmitter of the second wireless signal to the first node.

13. The user equipment according to claim 9, wherein the transmission power of the first wireless signal is a smaller value of third power value and fourth power value, wherein the third power value is fixed, or the third power value is explicitly configured, the fourth power value is linearly related to the product of the first power value and the first coefficient, or the product of the second channel quality and the second coefficient, or both the product of the first power value and the first coefficient and the product of the second channel quality and the second coefficient.

14. The user equipment according to claim 9, wherein the transmission power of the first wireless signal is a smaller value of third power value and fifth power value, wherein the third power value is fixed, or the third power value is explicitly configured, the fifth power value is associated with the product of the first path loss and the first coefficient, or the product of the second channel quality and the second coefficient, or both the product of the first path loss and the first coefficient and the product of the second channel quality and the second coefficient; the first path loss decreases linearly as the first power value increases.

* * * * *